United States Patent [19]
Ammann et al.

[11] 3,861,660
[45] Jan. 21, 1975

[54] PYROMETALLURGICAL SYSTEM WITH FLUID COOLED STIRRER

[75] Inventors: Paul R. Ammann, Reading; Thomas A. Loose, Billerica, both of Mass.

[73] Assignee: Kennecott Copper, Corp., New York, N.Y.

[22] Filed: Mar. 5, 1973

[21] Appl. No.: 338,328

[52] U.S. Cl. .......................... 266/34 A, 75/24, 75/61
[51] Int. Cl. ............................................ C21c 7/00
[58] Field of Search ......... 13/26 S; 75/24, 61, 93 R; 266/34 A, 34 T; 65/178; 416/96

[56] References Cited
UNITED STATES PATENTS

| | | | |
|---|---|---|---|
| 1,169,270 | 1/1916 | Langguth | 266/34 A |
| 1,479,511 | 1/1924 | Parsons | 416/96 |
| 1,866,668 | 7/1932 | Protzeller et al. | 266/34 A |
| 2,319,402 | 5/1943 | Heuer | 266/34 A |
| 2,982,522 | 5/1961 | Hamilton et al. | 416/96 |
| 3,582,057 | 6/1971 | Beals | 266/34 L |

OTHER PUBLICATIONS

USSR Inventors Certificate No. 154998 to Bulakh, Published 9-18-62.

*Primary Examiner*—Gerald A. Dost
*Attorney, Agent, or Firm*—Kenway & Jenney

[57] ABSTRACT

A furnace or ladle for holding or reacting molten slag with other materials is agitated by a bladed or paddled stirrer. The stirrer has passageway formed therein for conducting a coolant fluid therethrough. The stirrer is formed of a heat conductive material such as copper. As a result of being cooled from the inside by the coolant, molten slag freezes on the blades of the stirrer and protects the blades from disintegration such as by erosion or corrosion. The frozen slag also insulates the stirrer from the electric current present in electric furnaces.

4 Claims, 5 Drawing Figures

PYROMETALLURGICAL SYSTEM WITH FLUID COOLED STIRRER

BACKGROUND OF THE INVENTION

In general the present invention is directed to pyrometallurigcal systems where a metal-bearing slag is contacted with other materials. In particular, the invention is a fluid cooled metal paddle for stirring a furnace or ladle in order to control and regulate the exposure of slag to a reactive matte or metal.

Mattes, metals, or metal alloys such as molten sulfides have been utilized to refine molten metal-bearing slags. One factor controlling the reactions between slag and matte and consequently the efficiency of such slag purification is the extent to which the matte contacts the slag. Various known prior art methods for increasing the interphase contact between the slag and the matte include gas injection through tuyeres or lances, utilizing rotating furnaces, such as top blown rotary converter or Caldo furnaces, and transferring molten material from one vessel to another. The last method is often referred to as the "cocktail shaker" method. The foregoing methods suffer from deficiencies when compared to a system employing mechanical stirring. The advantages of mechanical stirring include improved control of the reaction rate and phase separation which is accomplished by controlling the stirring speed as well as the position of the stirrer in the molten material. Mechanical stirrers have low energy requirements when compared to rotary furnaces, are simpler to operate and require less maintenance. In addition to being relatively inexpensive, mechanical stirrers promote homogeneous isothermal melts.

At this point, it should be noted that mechanical stirrers or agitators have been used in various furnace environments. Prior art agitators can be classified into two main groups—non-cooled agitators and cooled ceramic agitators. Non-cooled agitators include systems where a material such as a graphite rod is used to stir molten lead. Solid pieces of ceramic have also been used to stir molten material. Since the non-cooled agitator dissolves in the molten material, it must be replaced periodically and can only be used in systems where the presence of stirrer material in the molten material is not deleterious; for example, systems including iron and $CaO \cdot SiO_2$ slags. In connection with slag-matte and slag-metal systems, non-cooled agitators have been demonstrated to have a very short life. Thus, because of the high temperature of such systems, corrosion is severe, making non-cooled agitators unfeasible.

Cooled ceramic materials have also been employed to stir molten substances such as glass. Even cooled ceramic agitators, however, are not feasible in slag-matte systems because ceramic materials, even though cooled from the inside, corrode rapidly on the outside in a slag-matte system. The foregoing is true because of the low conductivity of ceramics and the fact that slags are good solvents for ceramic materials and can dissolve ceramic materials at relatively low temperatures. Furthermore, ceramic stirrers have low resistance to mechanical shock, are limited in size and have high costs.

Accordingly, it is an object of the present invention to provide an improved system for mechanically stirring slag-matte and slag-metal systems.

A further object of the invention is to provide a mechanical stirrer which enables increased interfacial contact for slag-matte and slag-metal systems involving interphase reactions.

A further object of the invention is to provide a mechanical stirrer for a pyrometallurgical system which will be able to withstand the corrosive environment of slag-matte or slag-metal systems.

SUMMARY OF THE INVENTION

These and other objects of the invention are accomplished by a reactor which includes a mechanical stirrer for stirring molten slags at high temperatures. The stirrer is formed of a heat conductive metal and is fluid cooled. Cooling causes slag to freeze on the surface of the stirrer providing thermal insulation and protection from corrosive materials in the slag phase of the system and electrical insulation and protection from the electric discharges of electric furnaces.

DESCRIPTION OF THE PREFERRED EMBODIMENTS

At the outset, the invention is described in its broadest overall aspects with a more detailed description following. This invention is a reactor which is designed to achieve very fast reactions in pyrometallurgical systems, particularly between molten slags and mattes (molten sulfides) or metals and between constituents in other immiscible metallurgical systems. In connection with the foregoing, the term "slag" as used in this art describes silicate based materials associated with the production of metals. Thus, the term covers a wide variety of materials. A mechanical stirrer is used in a furnace or ladle to promote mixing of the system and thereby achieve intimate contact between the slag and matte or metal phases which increases reaction rates. The stirrer is cooled to freeze slag on its exposed surfaces to thermally insulate and protect the stirrer from the corrosive environment of the system as well as to provide electrical insulation from the electric discharges that occur in electric furnaces.

Figure 1:
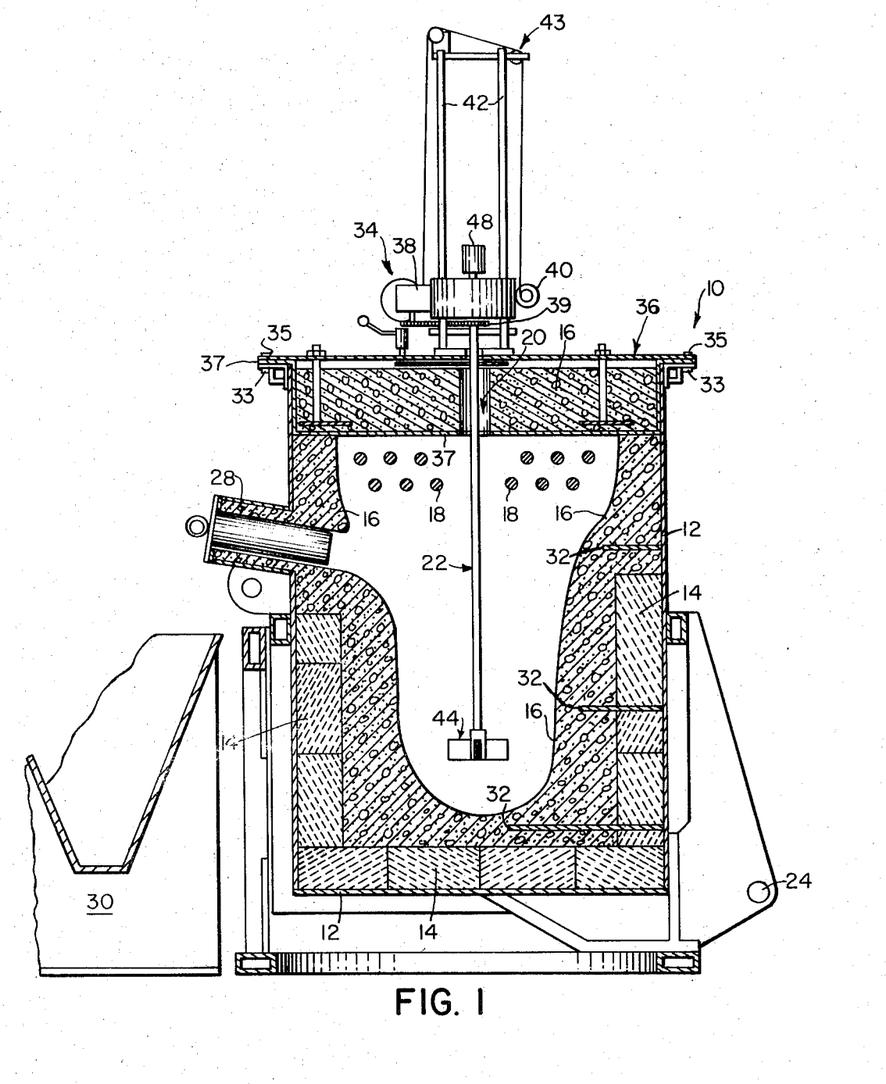
FIG. 1 is a cross-sectional plan view of a pyrometallurgical system including a fluid cooled stirrer in accordance with the present invention.

A reactor in accordance with the present invention is shown in FIG. 1. The reactor of FIG. 1 includes a slag melting furnace with a refractory crucible. It should be noted at the outset, however, that the stirrer of the present invention finds application in many pyrometallurgical systems. In this regard, the stirrer of the present invention is useful in furnaces such as the one shown in FIG. 1, slag melting furnaces with steel crucibles, ladles for holding a molten material and reactors of the type utilized in metal or matte-slag reactions which are connected in series. Furthermore, the furnace shown in FIG. 1 is a pilot scale furnace which was constructed to demonstrate the feasibility of furnaces with fluid cooled stirrers. In this regard, the furnace shown in FIG. 1 is rather small when compared to conventional metallurgical furnaces. As stated above, however, the stirrer of the present invention can be used to great advantage in a number of pyrometallurgical systems. Thus, the inclusion in the specification of the furnace of FIG. 1 is not intended to be limiting in any way.

The pyrometallurgical system of FIG. 1 includes a furnace 10 comprised of a steel box 12 filled with refractory bricks 14. The furnace is lined with a castable chrome-magnesia refractory 16. The furnace is heated by two horizontal rows of Globar heating elements 18. A gap 20 in the center of the furnace top allows for the charging of materials and the entry of a stirrer shaft 22. The maximum input of the furnace is about 80 KW.

Also shown in FIG. 1 is a hook 24 to tip the furnace, a pour spout 28 and a mold 30 for receiving poured slag. Of course, other plugs (not shown) can also be used to empty furnaces which are too large to tip conveniently. The furnace also includes thermocouples 32 to control the temperature of the furnace. A stirrer assembly 34 is mounted on top of a removable furnace top 36. As is shown in FIG. 1, top 36 is inclusive of a steel frame member 37 which is supported by steel box 12. Frame member 37 is also lined with refractory 16. The top 36 is secured by nuts 35 to bolts 33. By removing nuts 35, top 36 can be removed to allow for furnace maintenance and repair. The stirrer assembly 34 can be raised and rotated by two separate motors, a motor 38 which drives a belt 39 for rotating the stirrer and a motor 40 for raising and lowering the stirrer assembly. Guides 42 and a pulley system 43 are also provided for raising and lowering the stirrer assembly.

Figure 2:
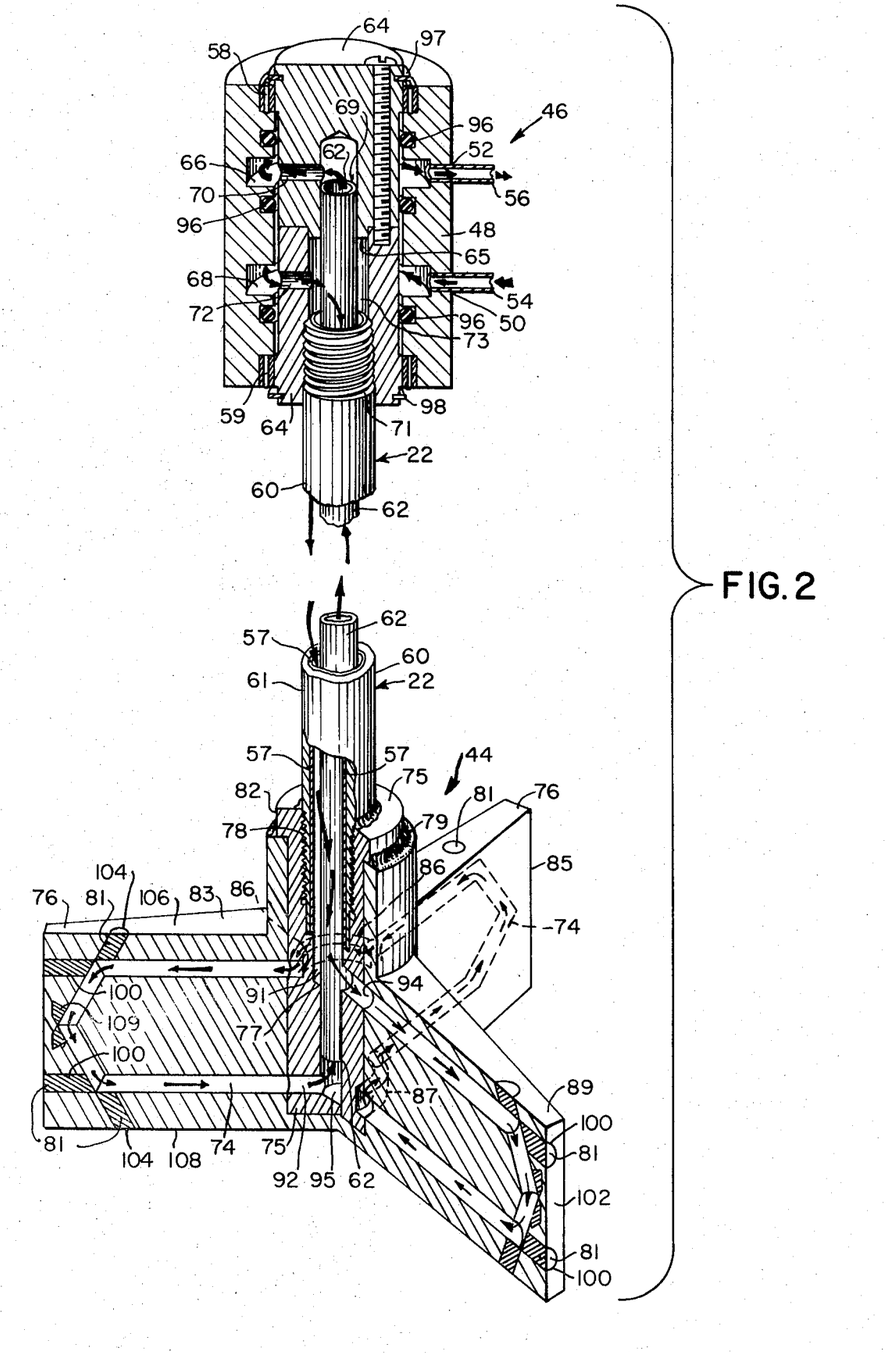
FIG. 2 is a cut-away perspective view partially in section of the stirrer of FIG. 1.

As is shown in FIG. 2, the stirrer of the present invention is inclusive of a stirrer shaft assembly 22, a paddle or blade assembly 44, and a water delivery assembly 46. The stirrer shaft assembly, water delivery assembly and paddle or blade asembly are assembled in conjunction with each other so that the stirrer can be rotated while a coolant, such as water, flows through the stirrer itself. To provide a route for the coolant back and forth between the paddle assembly 44 and the water delivery assembly 46, shaft 22 is inclusive of two concentric tubes, one being an outer cylindrical member 60 and the other being an inner tubular member 62. Thus, as is shown in FIG. 2, the outer cylindrical member 60 of shaft 22 is concentric about and spaced apart from inner tubular member 62. Outer cylindrical member 60 is inclusive of a steel shaft 61 and a copper sleeve 57. Inner tubular member 62 may be formed of copper.

As stated above, the stirrer of the present invention must not only rotate, but must also have a continuous flow of a fluid, such as water, flowing therethrough while being rotated. To enable rotation of the stirrer and also enable a proper flow of liquid therethrough at the same time, the upper end of shaft 22 extends into the water delivery assembly 46 in the manner described below.

Water delivery assembly 46 is inclusive of a stationary jacket 48 having ports 50 and 52 formed therein which communicate with a fluid inlet conduit 54 and a fluid outlet conduit 56 respectively. To enable rotation of the stirrer and flow of water therethrough, an upper distributor 64 is maintained within stationary jacket 48. Distributor 64 is rotatably maintained within stationary jacket 48 by upper and lower bearings 58 and 59. To provide continuous fluid inlet and fluid outlet communication with inlet conduit 54 and outlet conduit 56 while the stirrer is rotating, stationary jacket 48 is provided with grooves 66 and 68. Distributor 64 includes bores 70 and 72 which communicate with grooves 66 and 68 respectively. Thus, as is shown in FIg. 2, distributor 64 is rotatably maintained within jacket 48 by bearings 58 and 59 so that bore 70 is in fluid communication with groove 66 for any orientation of distributor 64 with bore 72 also being in fluid communication with groove 68 for any orientation of distributor 64.

Although not shown in the drawing, it should be noted that grooves 66 and 68 are each a continuous, uninterrupted circular groove within the inner wall formed by a bore in jacket 48.

To receive shaft 22, distributor 64 is provided with a stepped axial bore having a geometry adapted to conform to the geometry of the upper end of shaft 22. As is shown in FIG. 2, steel shaft 61 has threads 71 in its uppermost end which screw into corresponding threads on the bottom end of distributor 64. Inner tubular member 62 extends beyond threaded end 71 of cylindrical member 60 into a bore 69 formed in the upper portion of distributor 64. Bore 69 is of a size sufficient to enable a friction fit between distributor 64 and inner tubular member 62. With the foregoing arrangement, inner tubular member 62 is maintained within cylindrical member 60 so that an uninterrupted passageway between the outer walls of inner tubular member 62 and the inner walls of copper sleeve 57 is possible. As is also shown in FIG. 2, bore 69 is stepped at 65 so as to form a chamber 73 within distributor 64. As should be apparent from the foregoing, a fluid, such as water, entering inlet conduit 54 will flow by means of groove 68 through bore 72 and into chamber 73 whereupon it will flow in the direction shown by the arrows down the passageway formed by the space between cylindrical member 60 and inner tubular member 62. On the other hand, water flowing up inner tubular member 62, in a direction shown by the arrows, will flow out of the top of tubular member 62 through bore 70 whereupon after passing through groove 66 will leave the stirrer through outlet conduit 56. It should also be clear that the foregoing flow pattern will be unaffected by rotation of the stirrer shaft.

Figure 3:
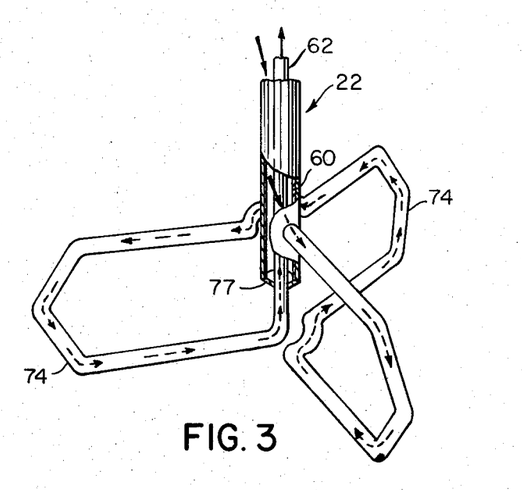
FIG. 3 is a diagrammatic view showing the flow of fluid through the blades of a stirrer in accordance with the present invention.

The bottom end of shaft 22 is received by the paddle or blade assembly 44. As is best shown in FIG. 3, a passageway 74 which snakes through the paddle blades extends through cylindrical member 60 so that water passing between cylindrical member 60 and inner tubular member 62 can enter passageway 74. Water entering passageway 74 travels through the blades in the direction shown by the arrows and ultimately re-enters the shaft assembly 22 from the bottom thereof whereupon fluid, such as water, leaving the passageway 74 enters the inner passageway formed by tubular member 62.

To enable the foregoing flow pattern through blade assembly 44, blade assembly 44 is inclusive of a distributor 75. Distributor 75 is inclusive of a central axial bore which is closed at its lowest end with a geometry conforming to the geometry of the lower end of shaft 22. As is shown in FIG. 2, steel shaft 61 is provided with threads 78 which are received by corresponding threads in distributor 75. Inner tubular member 62 extends beyond threaded end 78 of cylindrical member 60, as is shown in FIG. 2. The bottom end of inner tubular member 62 is maintained within distributor 75 by a friction fit. Thus, the inner axial bore of distributor 75 is stepped as is shown at 77. The step at 77 not only enables the foregoing friction fit, but provides a water-tight seal so that water traveling between the cylindrical member 60 and the inner tubular member 62 will flow through the route formed by passageway 74 before entering tubular member 62.

At this point, it should be noted that a preferred procedure for forming passageway 74 in blades 76 is to first mold the three blades 76 as a unit 79. Three blade unit 79 has a propeller-like configuration with a central bore much like the bore in the center of a propeller about which a propeller turns. This bore is of a size such that distributor 75 can be securely maintained therein by a press fit.

Prior to engaging the three blade unit 79 with distributor 75, passageway 74 may be formed in blades 76 by drilling a series of bores in the blades, plugging a portion of the drilled bores to form u-shaped passageways and connecting the u-shaped passageways in each blade. The u-shaped passageway within each blade may be formed by boring two horizontal bores 100 in the blades from the tip 102 of the blades through the body of the blades to the central axial bore. Horizontal bores 100 are connected by two vertical bores 104 which are formed by boring one vertical bore from the top 106 of each blade through horizontal bore 100, with the second vertical bore being bored from the bottom 108 of said blade through the lower horizontal bore. The two vertical bores are bored so as to meet each other at 109 which is a point between said horizontal bores 100. Of course, the vertical bores can be formed prior to the horizontal bores if desired. After these interconnected network of bores are formed in each blade, rods 81 are utilized to plug the upper vertical bore with a plug above the horizontal bore and the lower vertical bore with a plug below the horizontal bore. A similar plug is also utilized to plug the area of the blade between the tip of the blade 102 and the vertical bores. The foregoing boring and plugging results in a u-shaped passageway within each blade, as is shown in FIG. 2. When the blades are formed of copper, it is advantageous to utilize copper rods as the material for plugs 81. After the blades are plugged, the blades with rods 81 therein are brazed to seal any possible leaks.

To connect passageway 74 in blade 83 with the passageway in blade 85, distributor 75 is provided with a groove 86. Groove 86 is arcuate in configuration and extends from blade 83 to blade 85 as shown by the dotted lines in FIG. 2. A similar groove 87 connects the passageway in blade 89 with the passageway in blade 85. To provide a fluid entrance into blade 89 and a fluid exit from blade 83, bores 92 and 94 are formed in distributor 75. Thus, distributor 75 is assembled in relation to three blade unit 79 such that the proper flow pattern will result; that is, so that the ends of the passageway line up with the proper grooves or bores in distributor 75, as is shown in FIG. 2. As is also shown in FIG. 2, distributor 75 is inclusive of a shoulder 82 for engagement with the three blade propeller unit. The distributor and propeller unit are press fitted and then brazed to form the blade assembly 44.

From the foregoing, it should be clear that water traveling through shaft 22 down the shaft between cylindrical member 60 and tubular member 62 will flow into a chamber 91 formed by shoulder 77 of distributor 75 and exit from the chamber 91 by way of bore 94 into passageway 74 of blade 89. Water will then flow through passageway 74 until it reaches bore 92 in distributor 75. As is shown in FIG. 2, one end of bore 92 communicates with passageway 74, with the other end of bore 92 communicating with a chamber 95 in distributor 75. Chamber 95 is the bottom portion of the bore into which inner tubular member 62 is press fitted. It should be noted that this bore does not extend through distributor 75 so that a floor is present in distributor 75 to form chamber 95. Water entering chamber 95 will be forced up the conduit formed by inner tubular member 62 and out of the stirrer via outlet 56 in the manner described above.

In connection with the construction of fluid cooled stirrers in accordance with the present invention, it should be noted that the fluid passageway formed throughout the stirrer should be water tight since it would not be desirable to have water leaking into the reactive mixture in the furnace or ladle. In this regard, the stirrer should be water cooled since air cooling the stirrer will not keep the surface of the stirrer cool enough to cause slag to freeze on it.

To prevent leakage of water as the distributor rotates, several "O" ring water seals 96 are included between stationary jacket 48 and distributor 64. Upper and lower snap rings 97 and 98 are also included.

The preferred material for forming the blades of the stirrer is copper since copper is a material with a relatively high conductivity and can be purchased at a reasonable cost. Of course, materials with heat conductivities similar to copper, such as silver, could be used, but the cost of fabricating such a stirrer is prohibitive.

It should also be noted that materials with lower heat conductivity properties than copper, such as iron, could also be used if a larger number of passageways than the number as is shown in FIG. 2 are formed in the blades or paddles.

In connection with the foregoing, it should be noted that shaft assembly 22 has an outer member 61 which is formed of steel. This type of construction is permissible in accordance with the present invention because the shaft is exposed to a large area of coolant. Thus, a highly heat conductive material is unnecessary. This, of course, is not the case for the blades; that is, since the percentage of material in the blades that is exposed to the coolant is not large, due to the small number of passageways, a good heat conductor, such as copper, is required for the blades.

In the pilot model described above, the shaft was rotated by a belt 39 which engaged the shaft 22 of the stirrer itself. It is, of course, apparent that a belt may be connected to the distributor 64, or appropriate gearing may be used. These concepts, howver, are well within the skill of those in this art and form no part of the present invention.

Figure 4:
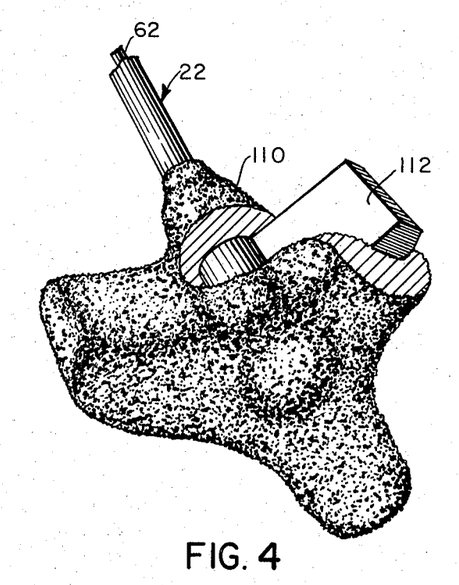
FIG. 4 is a perspective view of a stirrer, such as the one shown in FIG. 2, showing a protective slag skin or coating formed on the stirrer with a portion of the protective slag skin removed to show the metal blades of the stirrer.

When in use, slag which forms on the stirrer of the present invention protects the stirrer from corrosion. A slag skin 110 (see FIG. 4) may be formed on the stirrer by the following procedure. A ferrosilicate slag from a reverberatory furnace is poured into furnace 10 from a launder through spout 28. In accordance with the invention, a slag with an average composition (concentration) in percent by weight, as set forth in Table 1 below, can be used to form skin 110 on the stirrer.

TABLE 1

| Constituent | Concentration |
| --- | --- |
| $Fe_2SiO_4$ or | |
| $2FeO \cdot SiO_2$ | 57.72 |
| $Fe_3O_4$ | 5.0 |
| $SiO_2$ | 5.0 |
| $CaSiO_3$ | 16.0 |
| $MgSiO_3$ | 5.00 |
| $Al_2O_3 \cdot SiO_3$ | 8.00 |
| Cu | 0.50 |
| Mo | 0.30 |
| FeS | 0.64 |

The temperature of the slag is between 1,050°C – 1,500°C. With the slag in furnace 10, the stirrer is lowered into slag. Before being lowered into the slag, water at room temperature enters the stirrer through inlet conduit 54. The stirrer is rotated at about 100 rpms for 5 minutes to form a ferrosilicate slag skin 110 of a thickness of approximately 1 inch. While the stirrer is rotating in the molten slag, water at a temperature of about 50°C leaves the stirrer via outlet 56. The rate of flow of water through the stirrer is about 1 – 1 ½ gallons per minute. While water is flowing through the blades, the temperature of the outer surfaces 112 is about 50°C.

It should be noted that the purpose of the stirrer is to increase contact between two immiscible phases in a pyrometallurgical system. Accordingly, a reactive matte or other immiscible phase may be added to the furnace in accordance with known procedures to extract metal values from the slag.

The stirrer of the present invention is particularly useful in systems where iron oxide and non-ferrous metals are reduced with carbonaceous materials, and where metal values are extracted from molten slag. However, the stirrer of the present invention can be used to advantage whenever a feed material is blended into a molten slag bath.

In the case of the reduction of iron oxide, ($Fe_3O_4$ and FeO) and non-ferrous metal values (such as copper, molybdenum, nickel or cobalt oxides) contained in slag with particulate carbonaceous material (coal, coke, etc.), since the carbonaceous materials are of lower density (1 to 2 gm/cc) than molten slag (ca 3 gms/cc), the former floats on the surface of the slag and chemical reactions between the two materials is slow. In addition, when iron oxide reacts with carbon at the high temperatures of molten slags, a gaseous product (CO or $CO_2$) is formed which tends to decrease the contact between the carbon and the slag. Furthermore, molten slag does not normally "wet" carbonaceous materials and there is poor contact.

Thus, for conducting chemical reduction in this system, it is important that the stirrer "pump" the carbon solids from the surface, down into the molten slag. In principle, this is blending solids into a liquid. This is effectively done by creating a vortex such that the "light" solids are brought into contact with the stirrer blades and "thrown" radially into the molten material. The stirrer may have a large blade relative to the containment vessel, or a small one. In the former case, a slow speed is needed to achieve the desired conditions, and in the latter, a higher speed of rotation is required. The stirrer may be centered in the vessel, or brought in on an angle.

A key advantage to the mechanical stirrer is that the solid carbon, which when submerged into the molten slag floats back to the surface, can be pumped back through the melt a number of times until it is efficiently consumed in the chemical reactions. Until the present invention, no device was known which could accomplish such pumping.

In the case of extraction of metal values (such as copper, molybdenum, nickel and cobalt) from molten slag into a molten sulfide matte or metal alloy, it is important to promote interfacial contact between the two immiscible phases (slag and matte or metal). The mechanical stirrer is thus designed to disperse the matte or metal phase into the slag. A vortex at the surface is not required. The agitator may be axially located in the furnace, or enter from the side, or at an angle; however, the location of the stirrer blades depends on the geometry of the slag and matte phases. Typically, the blade assembly diameter is ⅓ of the reactor diameter, or less, and the blades are immersed ⅔ of the slag depth. As the blade size diminished, the speed must be increased to provide sufficient energy to promote interfacial contact.

The present invention is further illustrated by the following non-limiting examples relating to the extraction of molybdenum and copper from molten slags.

EXAMPLE 1

A charge of 250 pounds of copper reverberatory furnace slag was remelted in a furnace which was heated by radiation from silicon carbide Globar heating elements. The approximate composition of the slag is given in Table 2 below.

TABLE 2

| Component | Composition (Weight Percent) |
| --- | --- |
| FeO | 46.5 |
| $Fe_3O_4$ | ~5 |
| $SiO_2$ | 41.0 |
| $Al_2O_3$ | 3.72 |
| CaO | 2.18 |
| Cu | 0.48 |
| Mo | 0.33 |
| Impurities | Balance |

The slag was molten at approximately 1,050°C. A water-cooled mechanical stirrer, consisting of three, equally-spaced copper blades, 3 inches long by 2 inches wide was lowered into the molten slag. A solid coating of slag formed on the blades and shaft immediately upon contact with the molten slag. The blades were located approximately 8 inches below the surface of the melt, which was 12 inches deep. The rotation of the stirrer could be varied between 0 and 350 RPM. The temperature of the slag was maintained between 1,200° and 1,250°C. during treatment.

With the slag being stirred at slow speed (10 RPM), 5 pounds of pyrite ($FeS_2$) and 3.8 pounds of coke, in the form of composite pellets was charged to the furnace and melted to produce an Fe-S matte. The coke was used to reduce FeO in the slag to iron and enrich the FeS matte in iron. The molybdenum and copper concentrations of the slag were measured as a function of time without stirring, as shown in Table 3 below.

TABLE 3

| Time (minutes) | Mo (Weight Percent) | Cu (Weight Percent) |
|---|---|---|
| 0 | 0.33 | 0.48 |
| 20 | 0.325 | (0.551) |
| 30 | 0.335 | 0.45 |
| 40 | 0.323 | 0.45 |
| 50 | 0.322 | 0.47 |
| 60 | 0.333 | 0.48 |
| 70 | 0.283 | 0.423 |
| 80 | 0.307 | 0.423 |

The matte product which ultimately contained the extracted molybdenum and copper had the composition set forth in Table 4 below.

TABLE 4

| Component | Composition (Weight Percent) |
|---|---|
| Mo | 5.26 |
| Cu | 6.35 |
| Fe | 58.2 |
| S | 17.6 |
| Slag | 12.6 |
| Total | 100 |

Allowing for the iron in the slag, the matte had a ratio of iron to sulfur of:

$$[(58.2) - (0.395)(12.6)]/(17.61) = 3.0$$

This represents an iron-rich matte as compared to FeS (Fe/S = 1.75). The results show that negligible extraction of molybedenum and copper occurred in 80 minutes without stirring even though the composition of matte was favorable for extraction of the molybdenum and copper. It was concluded that the poor rates of molybdenum and copper extraction were due to poor contact between the slag and FeS matte.

EXAMPLE 2

To demonstrate the effect of mechanical stirring, Example 1 was repeated. A charge of 250 pounds of slag was remelted in the same furnace. As small quantity of $Na_2MoO_4$ was added to the slag to adjust the molybdenum concentration. The melt was stirred at 300 RPM for 10 minutes and a sample withdrawn. The concentrations of molybdenum and copper were 0.365 weight percent and 0.462 weight percent, respectively. Ten pounds of pyrite concentrate ($FeS_2$) was charged to the furnace to produce an iron sulfide matte. Three pounds of charcoal briquets were placed on top of the melt to maintain a reducing furnace atmosphere. The system was stirred for 25 minutes and slag samples taken to follow the molybdenum and copper extractions. Between 25 and 55 minutes of the experiment, there was no extraction of molybdenum into the FeS matte. Six pounds of nails were added between 55 and 70 minutes to enrich the iron in the matte. Because of the time required to heat and melt the iron nails, it is estimated that the iron-rich matte was formed at 85 minutes of the run. Then the molybdenum was extracted rapidly during the next 20 minutes from 0.32 percent to 0.16 percent. This was $$(0.32 - 0.16/0.32 - 0.11) \times 100 = 76\% \text{ of maximum.}$$

From the results appearing in Table 5 below, it was concluded that in the mechanically stirred furnace, with an iron-rich matte, rapid extractions of molybdenum can be achieved.

TABLE 5

| Time | Mo (Wt. percent) | Cu (Wt. percent) | Stirring (RPM) | Matte |
|---|---|---|---|---|
| 0 | 0.36 | 0.48 | 300 | None |
| 10 | 0.365 | 0.46 | 300 | None |
| 25 | 0.368 | 0.49 | 280 | $FeS_2$ |
| 45 | 0.376 | 0.50 | 280 | $FeS_2$ |
| 55 | 0.383 | 0.51 | 280 | $FeS_2$ |
| 75 | 0.366 | 0.40 | 280 | Nails Added |
| 85 | 0.32 | 0.43 | 280 | Nails Melted |
| 95 | 0.28 | 0.42 | 280 | Fe-Fe/S Matte |
| 105 | 0.16 | 0.35 | 280 | Fe-Fe/S Matte |
| 120 | 0.11 | 0.29 | 0 | Fe-Fe/S Matte |

EXAMPLE 3

To evaluate the significant process variables in the extraction of metals from slag, a number of experiments were run. The major variables considered were: (1) rate of stirring, (2) weight ratio of molten matte to molten slag and (3) the iron to sulfur ratio in the matte.

Figure 5:
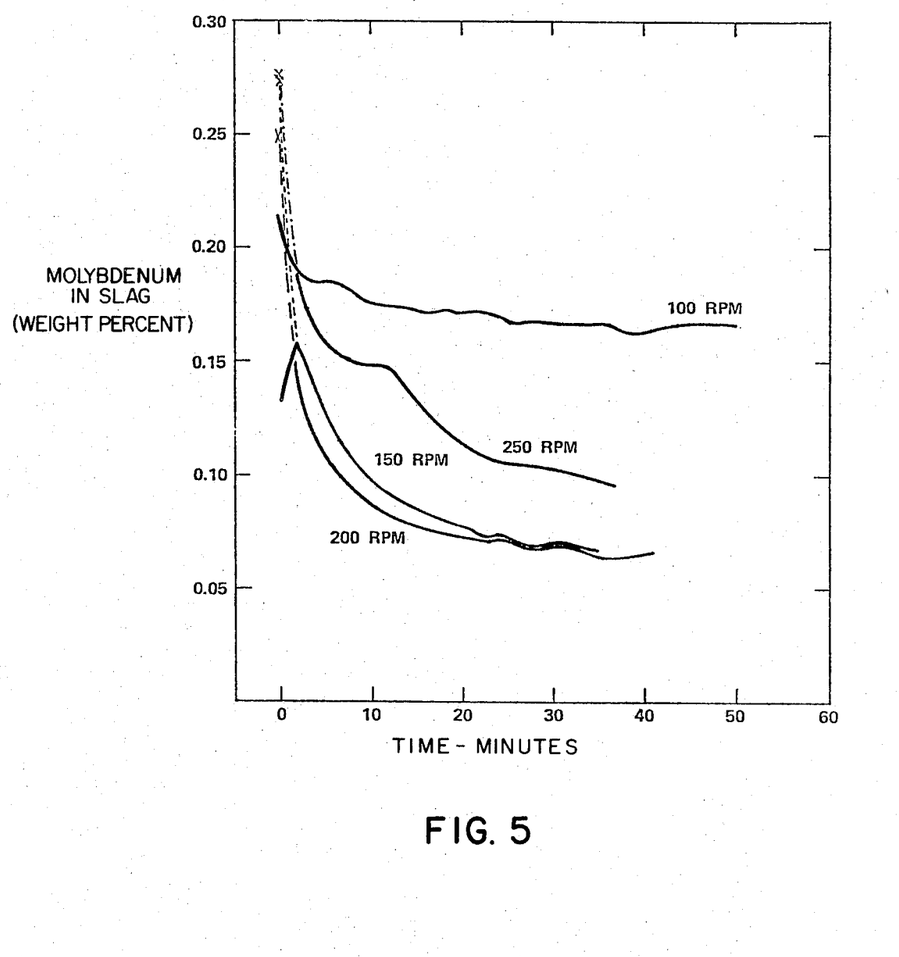
FIG. 5 is a graph showing the effect of the stirrer speed on molybdenum extraction from a copper smelter slag.

The effect of stirring on molybdenum extraction rate was measured in the range of 100 to 250 RPM. The measured rates of extraction are shown in FIG. 5. At 100 RPM, the extraction rate is very slow. Lower extraction rates occur at stirring speeds of less than 100 RPM. The rates of extraction are significantly higher at 150 and 200 RPM, but at 250 RPM and above, the "apparent" extraction rate is lower than at the lower speeds. This effect is caused by the dispersion of fine droplets of matte in the slag at very high stirring speeds, and because these drops do not separate from the slag rapidly, it appears that molybdenum has not been extracted from the slag. Thus, there is an optimum stirring rate which provides both rapid extraction and separation of the matte from the slag phases. Each system has its own optimum conditions, depending upon geometry of stirrers and slag bath.

The weight ratio of molten matte to molten slag is important since it affects the interfacial contact between the two phases. At 100 RPM, data shows significantly faster extraction rates with a matte-to-slag ratio of 60/250 as compared to a ratio of 30/250. At 150 RPM, the initial rate of molybdenum extraction is higher at the larger ratio of matte to slag, but the overall metal extractions are comparable after 20 minutes. Thus, the ratio of matte to slag is important, particularly at slower stirring speeds.

Finally, the composition of the matte; namely, the ratio of iron-to-sulfur, affects the distribution of molybdenum between the matte and slag, and hence the driving force (or chemical potential) for extraction. It also affects the degree of completion of the extraction.

The cooled stirrer of the type described above has been used for hundreds of hours without corrosion due to the protection afforded by the slag skin.

It should be apparent that many deviations from the stirrer described above are possible. For example, a larger number of passageways than are disclosed above can be formed in the blades of the stirrer. Furthermore, more than three blades can be included on the stirrer. Indeed, two bladed stirrers can be used to great advantage in accordance with the present invention. When two-bladed stirrers are used, however, it has been found advantageous to provide a pitch on the blades to increase turbulence. As is also apparent, any slag material which will freeze on the blades and form a protective skin is within the scope of the invention. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A stirrer for blending a material into a molten slag bath comprising a rotatably fluid delivery assembly for delivering a fluid coolant into and out of the interior of the stirrer;

a blade assembly inclusive of a number of metallic blades for blending a material into a molten slag bath, said blades having a fluid passageway therein;

a shaft assembly connecting said blade assembly to said fluid delivery assembly, said shaft assembly being inclusive of at least two fluid passageways, one being a delivery passageway for delivering a coolant to said blade assembly from said fluid delivery assembly and the other being a return passageway for returning a coolant from said blade assembly back to said fluid delivery assembly, said passageways in said shaft assembly being in fluid communication with said fluid delivery assembly and said passageway in said blade so that a fluid being dispensed from said fluid delivery assembly travels within the delivery passageway of said shaft assembly to said blade assembly whereupon said fluid travels through the passageway in said blades, returns to said shaft assembly and travels through said return passageway to said fluid delivery assembly for passage out of said stirrer, the stirrer being inclusive of inner and outer concentric pipes with a space therebetween, the inner walls of said inner concentric pipe forming the return passageway and the space between said concentric pipes forming the delivery passageway, said inner concentric pipe being a copper tube and said outer concentric pipe being a shaft lined with a copper sleeve; and a protective coating on the outer portion of the metallic blades of said stirrer, said protective coating being formed of slag and being the result of freezing molten slag on to said metallic blades.

2. A stirrer for blending a material into a molten slag bath comprising a rotatably fluid delivery assembly for delivering a fluid coolant into and out of the interior of the stirrer;

a blade assembly inclusive of a number of metallic blades for blending a material into a molten slag bath, said blades having a fluid passageway therein;

a shaft assembly connecting said blade assembly to said fluid delivery assembly, said shaft assembly being inclusive of at least two fluid passageways, one being a delivery passageway for delivering a coolant to said blade assembly from said fluid delivery assembly and the other being a return passageway for returning a coolant from said blade assembly back to said fluid delivery assembly, said passageways in said shaft assembly being in fluid communication with said fluid delivery assembly and said passageway in said blade so that a fluid being dispensed from said fluid delivery assembly travels within the delivery passageway of said shaft assembly to said blade assembly whereupon said fluid travels through the passageway in said blades, returns to said shaft assembly and travels through said return passageway to said fluid delivery assembly for passage out of said stirrer, the stirrer being inclusive of inner and outer concentric pipes with a space therebetween, the inner walls of said inner concentric pipe forming the return passageway and the space between said concentric pipes forming the delivery passageway, said inner concentric pipe being a copper tube and said outer concentric pipe being a steel shaft lined with a copper sleeve; and a protective coating on the outer portion of the metallic blades of said stirrer, said protective coating being formed of slag and being the result of freezing molten slag on to said metallic blades.

3. A stirrer for blending a material into a molten slag bath comprising a rotatably fluid delivery assembly for delivering a fluid coolant into and out of the interior of the stirrer;

a blade assembly inclusive of a number of metallic blades for blending a material into a molten slag bath, said blades having a fluid passageway therein;

a shaft assembly connecting said blade assembly to said fluid delivery assembly, said shaft assembly being inclusive of at least two fluid passageways, one being a delivery passageway for delivering a coolant to said blade assembly from said fluid delivery assembly and the other being a return passageway for returning a coolant from said blade assembly back to said fluid delivery assembly, said passageway in said shaft assembly being in fluid communication with said fluid delivery assembly and said passageway in said blade so that a fluid being dispensed from said fluid delivery assembly travels within the delivery passageway of said shaft assembly to said blade assembly whereupon said fluid travels through the passageway in said blades, returns to said shaft assembly and travels through said return passageway to said fluid delivery assembly for passage out of said stirrer, the stirrer being inclusive of inner and outer concentric pipes with a space therebetween, the inner walls of said inner concentric pipe forming the return passageway and the space between said concentric pipes forming the delivery passageway, said inner concentric pipe being a copper tube and said outer concentric pipe being a shaft lined with a copper sleeve, said outer concentric pipe of said stirrer assembly being threaded at both ends and engaging corresponding threads in said fluid delivery assembly and blade assembly with both ends of said inner concentric pipe extending beyond said threaded ends; and a protective coating on the outer portion of the metallic blades of said stirrer, said protective coating being formed of slag and being the result of freezing molten slag on to said metallic blades.

4. A stirrer for blending a material into a molten slag bath comprising a rotatably fluid delivery assembly for delivering a fluid coolant into and out of the interior of the stirrer;

a blade assembly inclusive of a number of metallic blades for blending a material into a molten slag bath, said blades having a fluid passageway therein;

a shaft assembly connecting said blade assembly to said fluid delivery assembly, said shaft assembly being inclusive of at least two fluid passageways, one being a delivery passageway for delivering a coolant to said blade assembly from said fluid delivery assembly and the other being a return passageway for returning a coolant from said blade assembly back to said fluid delivery assembly, said passageway in said shaft assembly being in fluid communication with said fluid delivery assembly and said passageway in said blade so that a fluid being dispensed from said fluid delivery assembly travels within the delivery passageway of said shaft assembly to said blade assembly whereupon said fluid travels through the passageway in said blades, returns to said shaft assembly and travels through said return passageway to said fluid delivery assembly for passage out of said stirrer, the stirrer being inclusive of inner and outer concentric pipes with a space therebetween, the inner walls of said inner concentric pipe forming the return passageway and the space between said concentric pipes forming the delivery passageway, said inner concentric pipe being a copper tube and said outer concentric pipe being a steel shaft lined with a copper sleeve, said outer concentric pipe of said stirrer assembly being threaded at both ends and engaging corresponding threads in said fluid delivery assembly and blade assembly with both ends of said inner concentric pipe extending beyond said threaded cends; and a protective coating on the outer portion of the metallic blades of said stirrer, said protective coating being formed of slag and being the result of freezing molten slag on to said metallic blades.

* * * * *